United States Patent Office 3,242,047
Patented Mar. 22, 1966

3,242,047
1,1-DICHLORO-2,2-DIFLUOROPROPANE ANAESTHETIC
Donald Thomas Cropp, Widne, and James Raventos, Macclesfield, England, assignors to Imperial Chemical Industries Limited, London, England, a corporation of Great Britain
No Drawing. Filed Apr. 21, 1964, Ser. No. 361,543
Claims priority, application Great Britain, May 8, 1963, 18,201/63
7 Claims. (Cl. 167—52)

This invention relates to new inhalant anaesthetic compositions containing 1,1-dichloro-2,2-difluoropropane.

1,1-dichloro-2,2-difluoropropane is a known compound. We have now found, and herein lies our invention, that it possesses anaesthetic properties and is substantially free from undesirable side effects when administered as an inhalant anaesthetic. It is therefore useful for the production of anaesthesia in animals.

According to the invention we provide inhalant anaesthetic compositions comprising 1,1-dichloro-2,2-difluoropropane in admixture with at least one substance selected from oxygen, air, pharmaceutically-acceptable stabilisers, known inhalant anaesthetics and inert, pharmaceutically-acceptable gases.

It will be appreciated that, in order to be suitable for use for anaesthetic purposes, the 1,1-dichloro-2,2-difluoropropane should be free from any toxic impurities which may be present according to the particular process used for its manufacture.

As suitable stabilisers there may be mentioned, for example, ethanol, pharmaceutically-acceptable antioxidants of the aromatic amine type, for example diphenylamine, and pharmaceutically-acceptable antioxidants of the phenol type, for example thymol.

As suitable known inhalant anaesthetics there may be mentioned, for example, ether, chloroform, nitrous oxide, ethylene, trichloroethylene, cyclopropane, halothane, divinyl ether and trifluoroethyl vinyl ether.

As suitable inert, pharmaceutically-acceptable gases there may be mentioned, for example, carbon dioxide and nitrogen.

Those of the compositions of the invention containing oxygen and/or air may contain, for example, between 0.4% and 5.0% by volume of 1,1-dichloro-2,2-difluoropropane.

The compositions of the invention may be used for the production of anaesthesia by the adaptation of known techniques. Thus, for example, the gaseous compositions of the invention containing sufficient oxygen to maintain adequate respiration may be administered by inhalation at the appropriate rate to produce the desired depth of anaesthesia. Alternatively, for example, those of the compositions of the invention containing insufficient oxygen to maintain adequate respiration may be vaporised and mixed with sufficient oxygen or gaseous mixture containing oxygen, for example air, either prior to administration or during the course of administration, so as to form a gaseous inhalant anaesthetic composition containing sufficient anaesthetic agent or agents to produce the desired depth of anaesthesia and containing sufficient oxygen to maintain adequate respiration.

The margin of safety in using 1,1-dichloro-2,2-difluoropropane as an inhalation anaesthetic is relatively high. In mice, the $AC_{50}$ (i.e. the minimum concentration by volume of vapour needed to produce full anaesthesia in 50% of the test mice within 30 minutes) is 0.6%, and the $LC_{50}$ (i.e. the minimum concentration by volume of vapour needed to kill 50% of the test mice within 30 minutes) is 3.15%. Thus, the margin of safety as measured in mice by the $LC_{50}/AC_{50}$ ratio is 5.3. Under the same conditions the $LC_{50}/AC_{50}$ of ether is 1.77 and that of chloroform is 1.75. In rabbits the $AC_{50}$ of 1,1-dichloro-2,2-difluoropropane is 1.35% and the $LC_{50}$ is 3.44%, and consequently the $LC_{50}/AC_{50}$ ratio is 2.23. Furthermore, administration of a gaseous mixture consisting of 3.53% by volume of 1,1-dichloro-2,2-difluoropropane and 96.47% by volume of oxygen to dogs affords a quiet, smooth induction of anaesthesia, and surgical anaesthesia may be maintained in dogs by the administration of a gaseous mixture consisting of 1.86% by volume of 1,1-dichloro-2,2-difluoropropane and 98.14% of oxygen. Administration of a mixture consisting of 2.23% by volume of 1,1-dichloro-2,2-difluoropropane and 97.77% by volume of oxygen to dogs for two hours produces no cardiac irregularities and only very slight hypotension.

The invention is illustrated but not limited by the following examples:

Example 1

A rabbit is tied on a dissection table, and a tight face mask fitted with unidirectional respiratory valves is applied. The inguinal region is infiltrated with procaine, and the femoral artery is dissected and canulated for recording the blood pressure.

A mixture consisting of 2.25% by volume of 1,1-dichloro-2,2-difluoropropane and 97.75% by volume of oxygen is prepared and collected in a Douglas bag. This mixture is administered by inhalation to the rabbit, and continuous records of blood pressure, respiratory rate, minute volume and E.C.G. are taken. 10 minutes after the beginning of the inhalation the rabbit is fully anaesthetised with loss of corneal reflexes. The concentration of anaesthetic agent in the inhaled mixture is then reduced to 1.35% by volume, and inhalation of this mixture, and consequential anaesthesia, is maintained for 1 hour. No cardiac irregularities or adverse effects upon blood pressure are observed during this period.

Example 2

A dog is lightly anaesthetised with halothane so that it is possible to intubate with an intratracheal tube with an inflating cuff, and the femoral artery is dissected and canulated for recording the blood pressure. The dog is allowed to recover from the halothane anaesthesia, and then a gaseous mixture consisting of 3.5% by volume of 1,1-dichloro-2,2-difluoropropane and 96.5% by volume of oxygen is administered by a similar method to that described in Example 1. Continuous records of blood pressure, respiratory rate, minute volume and E.C.G. are taken. Surgical anaesthesia is produced within 5 minutes after the beginning of the inhalation of the mixture containing 3.5% by volume of the anaesthetic agent. Inhalation of this mixture is continued for a further 5 minutes, and then the concentration of anaesthetic agent in the inhaled mixture is reduced to 1.9% by volume. Inhalation of this mixture, and consequential anaesthetia, is maintained for 2 hours. No cardiac irregularities or adverse effects upon blood pressure are observed during this period.

What we claim is:

1. An inhalant anaesthetic composition comprising 1,1-dichloro-2,2-difluoropropane in admixture with oxygen in suitable proportions for the production of anaesthesia.

2. A composition as claimed in claim 1 wherein the oxygen is present as a gaseous mixture containing at least one gas selected from the group consisting of nitrogen and carbon dioxide.

3. A composition as claimed in claim 2 wherein the gaseous mixture is air.

4. A composition as claimed in claim 1 which additionally contains a stabilizer selected from the group consisting of ethanol, diphenylamine and thymol.

5. A composition as claimed in claim 1 which additionally contains an inhalant anaesthetic selected from the group consisting of ether, chloroform, nitrous oxide, ethylene, trichloroethylene, cyclopropane, halothane, divinyl ether and trifluoroethyl vinyl ether.

6. A composition as claimed in claim 1 wherein there is present between 0.4% and 5.0% by volume of 1,1-dichloro-2,2-difluoropropane.

7. A process for the production of anaesthesia which comprises administering to animals by inhalation a sufficient amount of a composition as claimed in claim 1 to produce the desired depth of anaesthesia while at the same time maintaining adequate respiration.

References Cited by the Examiner

FOREIGN PATENTS 894,823    4/1962    Great Britain.

OTHER REFERENCES

Robbins: J. Pharmacology and Exptl. Theraps., vol. 86, 1946, pp. 197–204.

JULIAN S. LEVITT, *Primary Examiner.*

J. D. GOLDBERG, *Assistant Examiner.*